No. 674,951.  
E. ABBE.  
METHOD OF GAGING SPHEROIDAL SURFACES.  
(Application filed June 8, 1900.)  
(No Model.)  
Patented May 28, 1901.

Witnesses  
Emil Donitz  
Paul Krüger

Inventor.  
Ernst Abbe

UNITED STATES PATENT OFFICE.

ERNST ABBE, OF JENA, GERMANY, ASSIGNOR TO THE FIRM CARL ZEISS, OF SAME PLACE.

METHOD OF GAGING SPHEROIDAL SURFACES.

SPECIFICATION forming part of Letters Patent No. 674,951, dated May 28, 1901.

Application filed June 8, 1900. Serial No. 19,588. (No model.)

*To all whom it may concern:*

Be it known that I, ERNST ABBE, doctor of philosophy, a subject of the Grand Duke of Saxe-Weimar, residing at No. 1 Carl Zeiss-strasse, Jena, in the Grand Duchy of Saxe-Weimar, German Empire, have invented a new and useful Method of Gaging Spheroidal Surfaces, of which the following is a specification.

In some optical systems complete correction of aberrations is facilitated by combining with strictly spherical surfaces one or several surfaces of spheroidal shape—*i. e.*, surfaces of revolution the axes of which coincide with the axis of the optical system and the curvatures of which vary from the vertex to the periphery, according to any definite rules.

The object of the invention is to attend the manufacture of the said surfaces with gaging operations step by step, so as to effectually control the gradual approximation of the surface being worked to its computed figure; and the invention consists in a method of testing whether a spheroidal surface has already attained the prescribed shape and of determining when such shape is not yet realized the zone where a defect exists and the amount of this defect.

Figure 1:
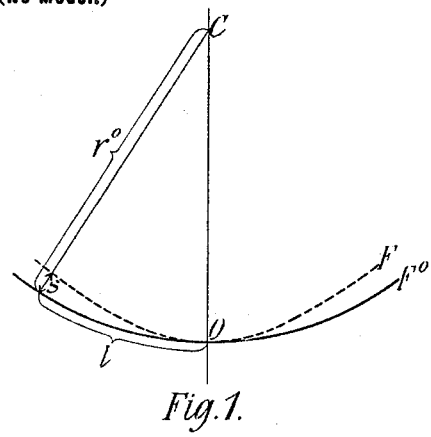
Figure 2:
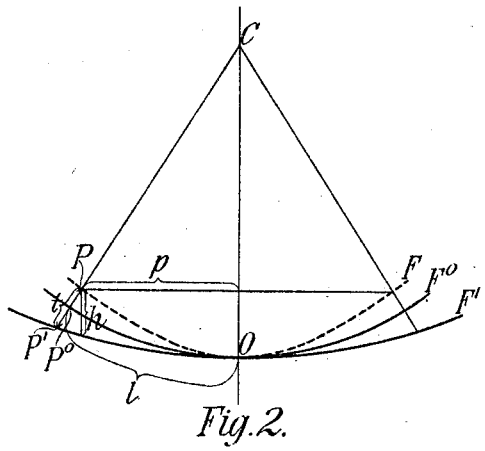
Figure 3:
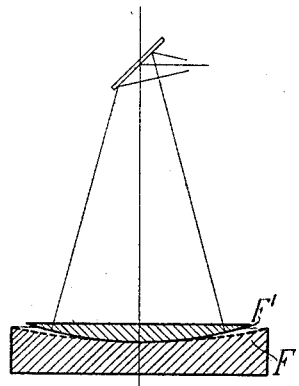
Figure 4:
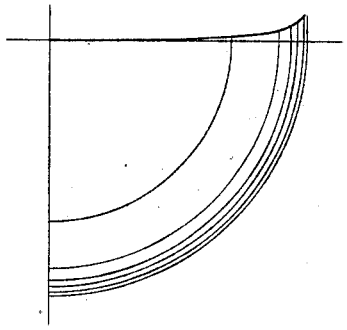
Figure 5:
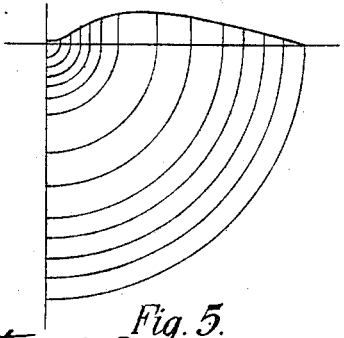
Figure 6:
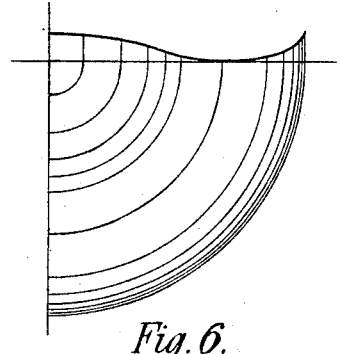

In the accompanying drawings, Figure 1 is a diagram drawn for assistance in the geometric definition of a spheroidal surface. Fig. 2 is another diagram illustrating the geometric theory of the testing method. Fig. 3 is an axial section through an arrangement for gaging a spheroidal surface according to the said method. Figs. 4, 5, and 6 are diagrams showing, for three different modes of contact between a spheroidal surface and a spherical gage-surface, the distribution of interference-rings, the observation of which belongs to the gaging operation referred to.

A spheroidal surface is determined by its meridional or primary section F, which may be defined by two data—first, the radius of curvature $r^0$, Fig. 1, in the vertex O, (vertex radius,) which is equal to the radius of the osculating circle $F^0$ in the vertex, and, second, the linear distance $s$ of each point P of the meridional curve F from the osculating circle $F^0$ of the vertex, this distance being measured in the direction of the radius $C P^0 = r^0$ and given as a function of the arc $l$ of the osculating circle $F^0$, $[s = f(l)$, wherein $l$ does not exceed a certain value.]

In spheroidal surfaces which are to be used for the optical purposes above mentioned the distances $s$ are very small—say a few hundredths of a millimeter at most. The linear deviations of such a spheroidal surface from the shape found by computation must be held by exact working below a still much lower amount—say a small fraction of a micron—or else the optical effect will undergo perceptible deficiencies.

The geometric foundation of the present method of gaging such spheroidal surfaces, which must realize the calculated form in a sufficiently-high degree of approximation, may be inferred from the diagram in Fig. 2. In addition to the denotations adopted from Fig. 1, F' is a circle which touches the spheroidal curve F in the vertex, its radius being hereinafter referred to as to $r'$. The function $s = f(l)$ being given for each point P of the spheroidal curve F, the following values may be determined: First, its distance $P P' = t$ from the circle F', measured in the direction of the radius $r^0$ of the osculating circle $F^0$; second, its distance $h$ from the circle F' measured in a direction parallel to the optical axis C O. These two distances $t$ and $h$ on account of the given function $s = f(l)$ and the given values of $r^0$ and $r'$ may easily be expressed as functions of the length $p$—*i. e.*, of the distance of the point P from the axis C O. In consequence thereof for each value of $p$ the corresponding values of $t$ and $h$ may numerically be calculated. It will be understood that the distance $t$ is the thickness (measured on the radius $r^0$) of the interstice between a spheroidal surface the meridional curve of which is F, and a spherical surface, a great circle of which is F', while the distance $h$ is the difference of height between the spheroidal calotte (having the axis O C and a basis-diameter $2 p$) and the spherical calotte, (of the same basis-diameter and the radius $r'$.) Now in the present method of gaging spheroidal surfaces a spherical surface is used having a radius $r'$ and serving to control the distance $t$, and in cases where the prescribed spheroidal surface largely deviates from a spherical one another spherical surface having also a radius $r'$, but a contrary curvature, may serve to control the distance $h$ when an approximate spheroidal surface is worked from a spherical one, as will fully be explained hereinafter.

The glass piece to be provided with a spheroidal surface is at first worked to have a provisional spherical surface of such a curvature that the prescribed spheroidal surface may be produced therefrom by working away the surplus zones. Moreover, for comparative purposes another glass disk is provided with a spherical surface of similar curvature, the exactly-measured radius $r'$ of which differs only slightly from the vertex radius $r^0$ of the prescribed spheroidal surface. Hereinafter a series of numerical values $h_1\ h_2\ h_3$ of the distance $h$ (relative to the prescribed spheroidal surface having the meridional curve F and to the spherical comparative surface, the radius $r'$ of which has been measured) is computed, so as to correspond to a series of values $p_1\ p_2\ p_3$ of the basis radius $p$ of both calottes. Then the provisional spherical surface is ground over by zones, so as to approach its figure to the prescribed spheroidal shape, this work being repeatedly suspended for controlling its progress by measuring the actual differences of height $h$ and comparing them with the calculated values. The spherometer, by means of which the said differences are measured, is preferably constructed with three supports instead of with an edged ring, these supports ending in little spheres, which are situated in the corners of an isosceles triangle. Means are provided for simultaneously adjusting the three supports for different basis radii $p$. After each adjustment the spheroidal surface and the spherical comparative surface are one after the other put upon the spherometer, so as to immediately measure the difference of height $h$ of both calottes and to compare it with the computed difference. With a spherical comparative surface which is sufficiently exact it is not difficult to produce according to the method described spheroidal surfaces which do not at any zone deviate from the prescribed surface more than one micron; but as in general a higher degree of accuracy will be required the stage now following of polishing the spheroidal surface by zones is to be controlled by gaging this surface from time to time according to the invention now to be described. A spherical gage-surface having the curvature opposite to that of the spheroidal surface to be gaged is formed on a glass disk the back of which is planed and likewise polished. Its radius $r$ differs only slightly from the vertex radius $r^0$ of the prescribed spheroidal surface, so that the gage-surface can be brought in contact with the surface to be gaged in a zone the diameter of which may have any value from zero up to the maximum diameter of the said surface. When both surfaces thus touch each other, the thickness $t$ of the small interstice remaining between them is to be measured for a series of radii $p$. This is effected by producing and observing a system of interference-rings in the said interstice. The arrangement shown in Fig. 3, which has originally been used by Fizeau, serves to illuminate the thin layer of air between both polished surfaces by causing monochromatic light to impinge upon the little mirror (or reflecting-prism) which is arranged in the axis of the spheroidal surface in such a way that the luminous rays reflected by it fall on the spherical gage-surface (indicated in Fig. 3 by the circle F') and also on the spheroidal surface to be gaged (indicated by the dotted meridional curve F) nearly at right angles and hereafter intersect each other in proximity of the illuminating-mirror to such an extent as reflected by both surfaces. The eye brought in this place, and assisted in the case of a very short distance by a magnifying-glass, and in the case of a very long distance by a telescope, perceives a dark interference-ring in each zone where the value of the distance $t$ is an integer multiple of $\frac{\lambda}{2}$, $\lambda$ being the wave length of the illuminating-light. It will be understood that for the zone, in which both surfaces are in contact, the value of $t$ is zero and that for the interference-rings counted off this zone the said value is equal to $\frac{\lambda}{2}, \lambda, \frac{3\lambda}{2}, 2\lambda$. The diameter $2p$ of each ring may easily be measured by a scale, either placed on the upper surface of the gage-disk or projected into the level of the layer of air. Then the series of values $t$ belonging to the series of ring-diameters $2p$ is to be compared with the series of values resulting (for the same diameters $2p$) from introducing the radius $r'$ of the gage-surface into the formula above referred to, which expresses $t$ as a function of $p$.

The number of interference-rings comprised between vertex and periphery of the surface to be gaged may be too large for conveniently counting and measuring them. In this case illumination should be effected by light of two different and well-known wave lengths and those zones only be dealt with in which two interference-rings of different colors coincide.

The upper part of Fig. 4 shows a curve, which represents the increase of $h$ from vertex to periphery in case the gage-surface touches the surface to be gaged in the vertex, and this latter surface is either convex and its curvature increasing toward the periphery or concave and its curvature decreasing toward the periphery. The lower part of Fig. 4 shows the distribution of the interference-rings in accordance with the curve in the upper part. Fig. 5 is a similar diagram, representing the case that the circular rim of the gage-surface rests on the surface to be gaged, while Fig. 6 represents the case that both surfaces touch each other in a circle which is not the periphery of one or both surfaces. By properly choosing the radius $r'$ of the spherical gage-surface relatively to the prescribed shape of the spheroidal surface the distribution of the interference-rings may be settled with a view of facilitating the work of counting and measuring them. With an exactly-figured gage-surface the interferential method enables the operator to reduce the deviation of the finished surface from the prescribed one to a very small fraction of a micron.

Where the difference between the prescribed spheroidal surface and a spherical surface is very small, the first-described method of grinding over by zones a provisional spherical surface and testing the surface being worked by spherometric measurements may be dispensed with, and immediately the said provisional spherical surface polished by zones and tested on the interferential method, which is the subject of the invention.

What I claim as my invention, and desire to secure by Letters Patent, is—

A method of testing, whether a spheroidal surface has the prescribed shape, and of determining the zones where deviations exist and the amounts of such deviations, which method consists in bringing the surface to be gaged in contact with a spherical gage-surface, the curvature of which is opposite to and only slightly different from the vertex curvature of the prescribed spheroidal surface (the said contact taking place in a circle of any diameter between zero and the maximum diameter of the surface to be gaged) and then observing the number and diameters of the interference-rings produced by the interstice between both surfaces so as to determine the thicknesses of the said interstice in the zones of the rings and compare them with the thicknesses prescribed for these zones, essentially as described.

In testimony whereof I have hereunto set my hand in the presence of two subscribing witnesses.

ERNST ABBE.

Witnesses:
EMIL DÖNITZ,
PAUL KRÜGER.